United States Patent [19]

Schmitz

[11] Patent Number: 4,952,856
[45] Date of Patent: Aug. 28, 1990

[54] METHOD AND APPARATUS FOR MONITORING RESISTOR TEMPERATURE

[75] Inventor: William E. Schmitz, Wilkinsburg, Pa.

[73] Assignee: AEG Westinghouse Transportation Systems, Inc., Pittsburgh, Pa.

[21] Appl. No.: 433,702

[22] Filed: Nov. 13, 1989

[51] Int. Cl.$^5$ .................. G05B 9/02; G05D 23/00
[52] U.S. Cl. ............................. 318/471; 318/472; 388/934
[58] Field of Search .............. 318/274, 471, 472, 473, 318/514; 388/934

[56] References Cited

U.S. PATENT DOCUMENTS

| | | | |
|---|---|---|---|
| 3,808,516 | 4/1974 | Hentschel | 318/471 X |
| 4,434,390 | 2/1984 | Elms | 318/473 |
| 4,573,132 | 2/1986 | Boothman et al. | 318/472 X |
| 4,743,818 | 5/1988 | Quayle et al. | 318/473 |

Primary Examiner—Bentsu Ro
Attorney, Agent, or Firm—Spencer & Frank

[57] ABSTRACT

Method and apparatus for monitoring the temperature of a resistor in a resistive current controller. The heating and cooling rates for the resistor are determined and a predicted temperature of the resistor is automatically calculated at the beginning each time interval of consecutive time intervals by subtracting from the previous temperature prediction for the resistor the product of the cooling rate of the resistor and the time interval and adding the product of the heating rate of the resistor and the time interval. An actuating signal is produced when the predicted temperature of the resistor for a given time interval corresponds to a threshold temperature.

17 Claims, 1 Drawing Sheet

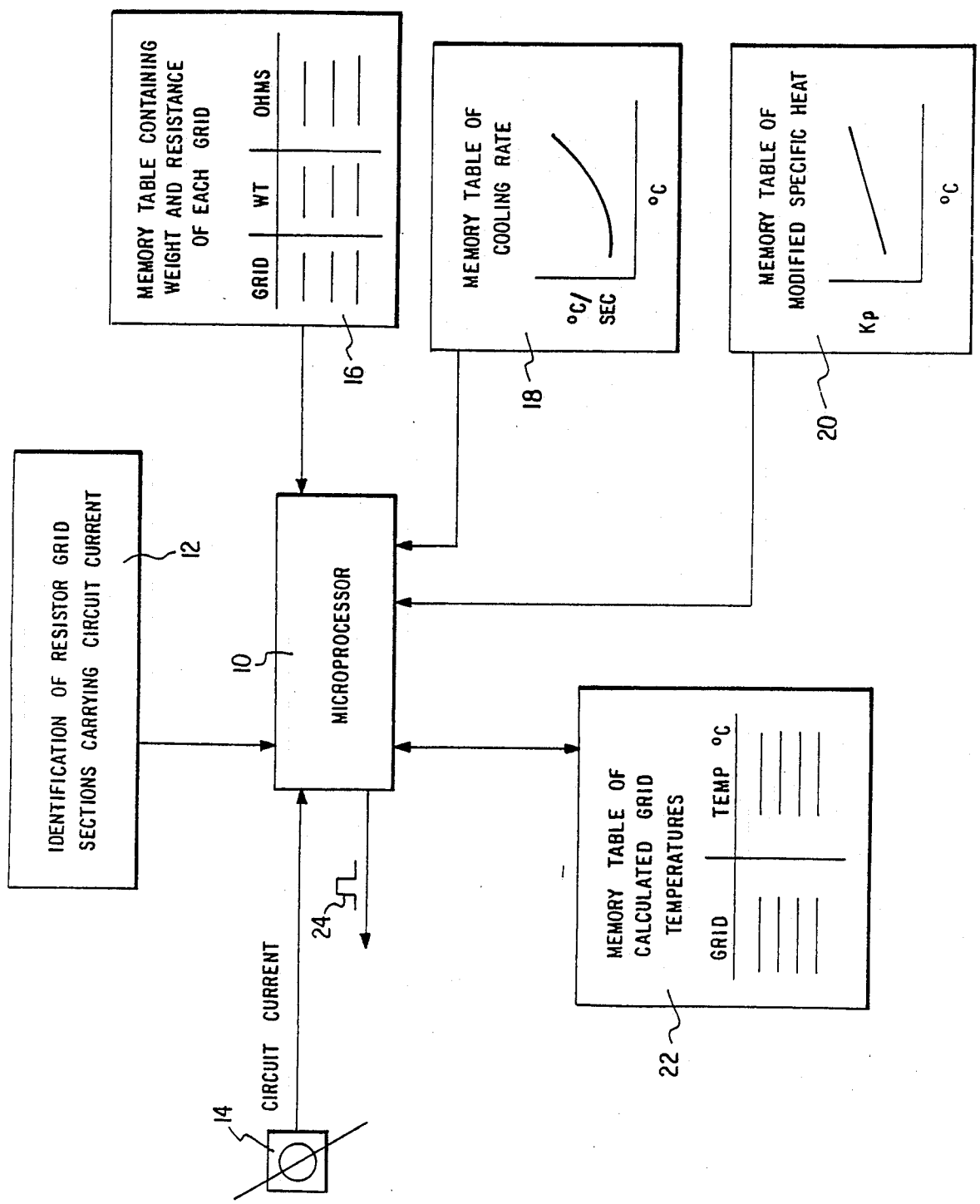

METHOD AND APPARATUS FOR MONITORING RESISTOR TEMPERATURE

BACKGROUND OF THE INVENTION

The invention relates generally to a method and apparatus for automatically monitoring the temperature of one or more resistors in a current controller, and more particularly in a current controller for an electric propulsion system.

Large electric motor systems often employ resistance grids for controlling the current to the motors during acceleration and braking sequences of the motors. Control systems employing such resistance grids in connection with electric propulsion motors for transit vehicles are disclosed, for example, in U.S. Pat. Nos. 3,218,537; 4,458,185, and 4,697,124. In these propulsion systems, resistor grids in series and/or parallel with the propulsion motors are selectively varied for controlling the current to the motors during the acceleration and deceleration of the vehicles. Electric motors used in such propulsion systems are large and powerful, and require equally large amounts of current, which when resistance control is employed, passes through the acceleration and brake resistor grids. Due to the nature of these control systems, the resistor grids are only subjected to large currents only during a relatively short period during acceleration and braking sequences, on the order of 10 seconds. As may be appreciated, the large currents through the resistor grids generate substantial heat. The resistor grids are designed to handle such heat and traditionally are oversized to handle heat generated during a variety of normal operational circumstances. The design operating temperature of each grid is generally on the order of 450° C. and the melting temperature of the grids in known systems is on the order of 1400° C. Nevertheless, there are instances in abnormal operation and emergency operation, such as running up a large grade or in the towing of dead cars, when excessive heat can be generated which can cause failure in one or more of the resistor grids.

It would therefore be desirable to have a system for monitoring the temperature of the resistor grids in order to prevent overheating resulting in failure of the resistors.

It is theoretically possible to monitor the actual temperature of the resistor grids with the use of an instrument, such as a thermal couple associated with each resistor grid. However, the use of thermal couples is problematic due to the high voltages across the resistor grids. Furthermore, the use of thermal couples to monitor the temperature of the resistor grids which could include as many as 20 different sections, soon becomes excessively expensive.

SUMMARY OF THE INVENTION

It is therefore an object of the invention to monitor the temperature of a resistor in a current controller without the use of external temperature measuring hardware.

It is a further object of the invention to provide a method and apparatus for determining the temperature of power and brake resistor grids of a resistance controller for an electric propulsion system.

It is yet a further object of the invention to provide a method and apparatus for automatically and continuously monitoring the temperature of resistor grids in an electric propulsion control system and to produce an actuating signal which can be used to automatically inhibit the propulsion system and/or to alert the operator of an overheating situation.

The above and other objects of the invention are accomplished according to the invention by the provision of a method and apparatus for automatically monitoring the temperature of a resistor in a current controller which includes: determining a heating rate for the resistor; determining a cooling rate for the resistor; calculating automatically, at the beginning of each time interval of consecutive time intervals, a predicted temperature of the resistor at the end of the respective time interval by subtracting from the next previous temperature prediction for the resistor the product of the cooling rate of the resistor and the time interval and adding the product of the heating rate of the resistor and the time interval; and producing an actuating signal when the predicted temperature of the resistor for a given time interval corresponds to a threshold temperature.

Advantageously, the actuating signal may be used to activate an alarm for an operator to take appropriate action. Alternatively, the actuating signal may be used to automatically inhibit or reduce power to the electric motor in order to prevent overheating and subsequent failure of the resistor.

In the context of an electric propulsion system, this would involve disconnecting the power supply from the electric propulsion motors or reducing power to the electric motor thereby reducing the current through the resistor in series with the electric motor and concomitantly avoiding overheating and possible melt down.

BRIEF DESCRIPTION OF THE DRAWINGS

The sole FIGURE in the drawings comprises a block diagram illustrating the principles of a resistor temperature monitoring system according to the invention.

DETAILED DESCRIPTION OF THE PREFERRED EMBODIMENT

Although the temperature monitoring method and apparatus according to the invention are applicable to a variety of situations where power resistors are subject to overheating, the invention will be described in the context of a resistance controller employing power and brake resistor grids during on-line operation of an electric propulsion system, such as that for a transit vehicle as described in the patents referenced above. Further, while the method and apparatus of the invention are applicable to any electric propulsion system, it can be most practically implemented on a microprocessor controlled propulsion system such as the Westinghouse Electric Cam system described in, for example, in U.S. Pat. No. 4,458,185, because no additional hardware is required to carry out the invention. That is, all the information needed for carrying out the invention is already available to the microprocessor in the Westinghouse Electric Cam system.

The temperature prediction method and apparatus according to the invention, is based upon an algorithm which calculates the predicted temperature of each resistor grid section of the power and brake resistor grids of the resistance controller. According to the invention, the temperature is predicted automatically and periodically after a specific increment of time. That is, if the time increment, or interval, is 0.25 seconds, the predicted temperature will be calculated at the beginning of the time interval, and will predict the temperature of the resistor at the end of the time interval, i.e., at the conclusion of 0.25 seconds. The algorithm for temperature prediction according to the invention is expressed as follows:

$$Tn = To - Rc*DT + Rh*DT, \text{ where}$$

Tn = new predicted temperature (°C.);
  To = the existing value for the temperature (°C.), which may be either an initial estimated temperature input into the system or the temperature predicted in the previous time interval;
  Rc = cooling rate (°C./sec) of the resistor at temperature To;
  Rh = the heating rate (°C./sec) of the resistor at temperature To; and
  DT = the time interval (sec) which preferably is on the order of 0.25 seconds in the context of a resistance controller for an electric propulsion system.

The heating rate of the resistor grid is theoretically simple to calculate because all of the electrical energy in the resistor grid is converted into heat. The heating rate may therefore be calculated as follows:

$$Rh = I^2*R/(WT*Cp), \text{ where}$$

I = the current (amps) through the grid section being monitored;
  R = the resistance (ohms) of the grid section;
  WT = weight (lbs) of the resistance material; and
  Cp = the specific heat (kw-sec/lbs-°C.) of the resistance material of the resistor.

Both the resistance of the resistor grid section and the specific heat vary with temperature. Although all of the foregoing parameters are known, including the ones that vary with temperature, a practical approach for implementing the invention is to develop empirical data for the grid heating and cooling rates. More specifically, empirical grid heating data can be developed to determine a modified specific heat which takes into account the resistance temperature coefficient, so that only ambient grid resistance values need be considered. The heating rate of a resistor grid section may therefore be expressed as follows:

$$Rh = I^2*R/(WT*Kp), \text{ where}$$

R = the nominal resistance (ohms) of the resistor grid section at 60° C.; and
  Kp = the modified specific heat derived from empirical data.

The cooling rate of the resistor grid is theoretically complicated, depending on conduction, convection and radiation heat transfer, and such system variables as air flow and grid shape, size and arrangement. However, applicant has determined from empirical testing of a Westinghouse MA-17 resistor tube, which is typically employed for such resistor grid sections, that it is possible to determine a still air cooling rate for a given size resistor grid tube. Testing with other parameters has shown that the cooling rate at elevated temperatures is relatively immune to system parameter variation, particularly air flow. Accordingly, this simplified empirical development of cooling rate data is adequate for the present purposes because the temperature prediction model only needs to be accurate at elevated temperatures.

The following empirical data for cooling rate and modified specific heat is typical of a Westinghouse MA-17 resistor tube used in resistance controllers of the type in which the present invention may be employed.

| Temp. (°C.) of tube | Cooling Rate (Rc) (°C./sec) | Modified Specific Heat (Kp) (KW-Sec/lb-°C.) |
|---|---|---|
| 100 | .11 | .23 |
| 200 | .26 | .25 |
| 300 | .46 | .25 |
| 400 | .73 | .25 |
| 500 | 1.01 | .28 |
| 600 | 1.43 | .30 |
| 700 | 2.24 | .30 |
| 800 | 2.33 | .32 |

Using empirical data for the cooling rate and modified specific heat, the algorithm for grid section temperature prediction is:

$$Tn = To - Rc*DT + I^2*R*DT/(WT*Kp).$$

Preferably, the cooling rate and modified specific heat for any given existing temperature To (i.e. the temperature predicted in the prior time interval) will be derived by interpolating the data in the table.

Referring to the FIGURE, there is shown a block diagram illustrating the principles of the resistor temperature monitoring system of the invention. A microprocessor 10, which may be an Intel 8086, is used to configure the electric propulsion motors of a propulsion system and to shunt in and out resistor grid sections in the manner described, for example, in U.S. Pat. No. 4,458,185. The operation of microprocessor 10 and the resistance controller in general form no part of the present invention.

For the present invention it is sufficient to know that microprocessor 10 keeps track of which resistor grid sections carrying circuit current to the propulsion motors, as schematically illustrated by block 12 in the FIGURE and the amplitude of the current passing through the various resistor grid sections as graphically illustrated by block 14 in the FIGURE. In accordance with the invention, the resistor temperature prediction algorithm as described above is programmed into microprocessor 10. Further, in accordance with the invention, microprocessor 10 is programmed with the data necessary for carrying out the algorithm, namely a lookup table 16 of the weight and resistance of each resistor grid section in the resistance controller; a lookup table 18 of the empirically derived cooling rates as a functions of temperature; and a lookup table 20 of the empirically derived modified specific heat for the resistor grid sections as a function of temperature.

At the beginning of regular intervals, such as 0.25 seconds, microprocessor 10 computes the predicted temperature at the end of the 0.25 second interval based upon the cooling rate and heating rate at the existing temperature To of each respective resistor grid section which is carrying current. That is, once every time interval, for example 0.25 seconds, the temperature of each grid section is updated and stored in a memory table 22 of calculated grid section temperatures. The calculated grid temperatures stored in memory table 22 then comprise the existing temperature To for the calculation according to the algorithm performed during the next succeeding time interval.

Typically, the design operating temperature of a grid section is 450° C. or less and the melting temperature of the grid is 1400° C. Therefore there is a large margin for error in the algorithm while still providing an effective shut-down point during an over heating situation. A threshold temperature, such as 800° C. can be set in the microprocessor such that when a calculated temperature of a grid section corresponds to the threshold temperature the microprocessor will issue an actuating signal 24 which can be used to activate an alarm or automatically inhibit the propulsion system as desired.

At the beginning of operation of the algorithm according to the invention, the memory table of calculated temperatures for the grid sections is arbitrarily set at or near ambient temperature. It is not necessary that the initial temperature set in memory table 22 be precise in that the algorithm is essentially self correcting over time and as the temperature increases.

With the use of the temperature monitoring system according to the invention it is possible to insure that resistor grid sections will never burn open due to any type of hardware failure or any accidental or purposeful misuse of a transit vehicle, such as pulling a train with one or two cars, or running up a grade for an extended period of time, wherein large currents passing through the resistor grid sections generate substantial quantities of heat, which could, if not properly monitored, result in melting the resistors.

Obviously, numerous and additional modifications and variations of the present invention are possible in light of the above teachings. It is therefore to be understood that within the scope of the appended claims, the invention may be practiced otherwise than as specifically claimed.

What is claimed is:

1. Apparatus for automatically monitoring resistor temperature in a resistive controller, comprising:
   storage means for storing the predicted temperature of the resistor;
   processor means for calculating, at the beginning of each time interval of consecutive time intervals, a predicted temperature of the resistor at the end of a respective time interval, according to the following equation and storing the predicted temperature in said storage means for use in the calculation of the predicted temperature in the next consecutive time interval:

$Tn = To - Rc*DT + Rh*DT$, where

Tn = the calculated predicted temperature at the end of a time interval;
   To = the temperature of the resistor at the beginning of a time interval;
   DT = the time interval;
   Rc = the cooling rate of the resistor at To; and
   Rh = the heating rate of the resistor at To; and
   actuating means for producing an actuating signal when the predicted temperature Tn corresponds to a threshold temperature.

2. The apparatus of claim 1, wherein there are a plurality of resistors and said processor means calculates the predicted temperature of each resistor at the beginning of each time interval and stores the predicted temperature of each resistor in said storage means; and said actuating means produces the actuating signal whenever the predicted temperature of any one of the resistors corresponds to the threshold temperature.

3. The apparatus of claim 1, and further including first memory means for storing a lookup table of empirically derived cooling rates for the resistor as a function of temperature, wherein said processor means selects a cooling rate from said first memory means corresponding to the temperature To for calculating the predicted temperature of each time interval.

4. The apparatus of claim 3, and further including second memory means for storing a lookup table of empirically derived specific heat of the resistor as a function of temperature, wherein said processor means selects a specific heat from said second memory means corresponding to the temperature To and calculates the heating rate Rh according to the equation:

$Rh = I^2 * R / (WT * Kp)$, where
   I = the current through the resistor;
   R = the nominal resistance of the resistor;
   WT = the weight of the resistor element; and
   Kp = specific heat of the resistor at To.

5. The apparatus of claim 4, wherein there are a plurality of resistors to be monitored; and further including third memory means for storing the weight and resistance of each resistor to be monitored, said processor means calculating the predicted temperature of each said resistor at the beginning of each time interval based upon the corresponding weight and resistance and the cooling rate and specific heat at temperature To, for each said resistor, and storing the predicted temperature of each said resistor in said storage means; and wherein said actuating means produces the actuating signal whenever the predicted temperature of any one of said resistors corresponds to the threshold temperature.

6. A method for automatically monitoring resistor temperature in a resistive controller, comprising:
   calculating, at the beginning of each time interval of consecutive time intervals, a predicted temperature of the resistor at the end of a respective time interval, according to the following equation;

$Tn = To - Rc*DT + Rh*Dt$, where
   Tn = the calculated predicted temperature at the end of a time interval;
   To = the temperature of the resistor at the beginning of a time interval;
   DT = the time interval;
   Rc = the cooling rate of the resistor at To; and
   Rh = the heating rate of the resistor at To;
   storing the predicted temperature for use in the calculation of predicted temperature Tn in the next consecutive time interval; and
   producing an actuating signal when the predicted temperature Tn corresponds to a threshold temperature.

7. The method of claim 6, wherein there are a plurality of resistors and said calculating step includes calculating the predicted temperature of each resistor at the beginning of each time interval; said storing step includes storing the predicted temperature of each resistor; and said producing step includes producing the actuating signal whenever the predicted temperature of any one of the resistors corresponds to the threshold temperature.

8. The method of claim 6, and further including the steps of storing a lookup table of empirically derived cooling rates for the resistor as a function of temperature; and selecting a cooling rate from the lookup table corresponding to the temperature To for use in said calculating step for calculating the predicted temperature Tn for each time interval.

9. The method of claim 8, and further including the steps of storing a second lookup table of empirically derived specific heat of the resistor as a function of temperature; and selecting a specific heat from the second lookup table corresponding to the temperature To; and wherein said calculating step includes calculating the heating rate Rh according to the equation:

$$Rh = I^2 * R/(WT * Kp), \text{ where}$$

I = the current through the resistor;
R = the nominal resistance of the resistor;
WT = the weight of the resistor element; and
Kp = specific heat of the resistor at To.

10. The method of claim 9, wherein there are a plurality of resistors to be monitored; and further including the step of storing the weight and resistance of each resistor to be monitored; and wherein said calculating step includes calculating the predicted temperature of each said resistor at the beginning of each time interval based upon the corresponding weight and resistance and the cooling rate and specific heat at temperature To for each said resistor; said storing step includes storing the predicted temperature of each said resistor; and said producing step includes producing the actuating signal whenever the predicted temperature of any one of said resistors corresponds to the threshold temperature.

11. Apparatus for monitoring the temperature of a resistor in a resistive controller, comprising:

current signal means for producing a signal representing the amplitude of the current through the resistor;
first storage means for storing a lookup table of cooling rates for the resistor as a function of temperature;
second storage means for storing a lookup table of specific heats of the resistor as a function of temperature;
third storage means for storing calculated values of resistor temperature;
processor means, coupled to said first, second and third storage means and said current signal means, for calculating, at the beginning of each time interval of consecutive time intervals, a predicted temperature of the resistor at the end of each respective time interval, according to the following equation and storing the predicted temperature in said third storage means for use in the calculation of predicted temperature for a subsequent time interval:

$$Tn = To - Rc * DT + I^2 * R * DT/(WT * Kp),$$

where
Tn = the calculated predicted temperature at the end of a time interval;
To = the temperature of the resistor at the beginning of a time interval;
DT = the time interval;
Rc = the cooling rate of the resistor at To;
I = the current through the resistor;
R = the nominal resistance of the resistor;
WT = the weight of the resistor element; and
Kp = specific heat of the resistor at To; and means for producing an actuating signal when the predicted temperature Tn corresponds to a threshold temperature.

12. A method of monitoring the temperature of a resistor in a resistive current controller, comprising:
determining a heating rate for the resistor;
determining a cooling rate for the resistor;
calculating automatically, at the beginning each time interval of consecutive time intervals, a predicted temperature of the resistor at the end of the respective time interval, by subtracting from the last temperature prediction for the resistor the product of the cooling rate of the resistor and the time interval and adding the product of the heating rate of the resistor and the time interval; and
producing an actuating signal when the predicted temperature of the resistor for a given time interval corresponds to a threshold temperature.

13. The method of claim 12, wherein said step of determining the cooling rate of the resistor includes forming a lookup table of empirically derived cooling rates for the resistor as a function of temperature and selecting a cooling rate from the lookup table of cooling rates which corresponds to the last predicted temperature of the resistor.

14. The method of claim 13, wherein said step of determining the heating rate of the resistor includes forming a lookup table of empirically derived specific heat of the resistor as a function of temperature, selecting a specific heat from the lookup table of specific heat which corresponds to the last predicted temperature, and dividing the product of the square of the current through the resistor at the beginning of the respective time interval and the resistance of the resistor by the product of the weight of the resistor and the selected specific heat.

15. Apparatus for automatically monitoring the temperature of a resistor in a resistive current controller, comprising:
means for determining a heating rate for the resistor;
means for determining a cooling rate for the resistor;
means for calculating automatically, at the beginning of each time interval of consecutive time intervals, a predicted temperature of the resistor at the end of the respective time interval, by subtracting from the last temperature prediction for the resistor the product of the cooling rate of the resistor and the time interval and adding the product of the heating rate of the resistor and the time interval; and
means for producing an actuating signal when the predicted temperature of the resistor for a given time interval corresponds to a threshold temperature.

16. The apparatus of claim 15, wherein said means for determining the cooling rate of the resistor includes means for storing a lookup table of empirically derived cooling rates for the resistor as a function of temperature and means for selecting a cooling rate from the lookup table of cooling rates which corresponds to the last predicted temperature of the resistor.

17. The apparatus of claim 16, wherein said means for determining the heating rate of the resistor includes means for storing a lookup table of empirically derived specific heats of the resistor as a function of temperature, means for selecting a specific heat from the lookup table of specific heats which corresponds to the last predicted temperature, and means for dividing the product of the square of the current through the resistor at the beginning of the respective time interval and the resistance of the resistor by the product of the weight of the resistor and the selected specific heat.

* * * * *